US012237759B2

(12) United States Patent
Park et al.

(10) Patent No.: US 12,237,759 B2
(45) Date of Patent: Feb. 25, 2025

(54) HIGH-EFFICIENCY INTEGRATED POWER CIRCUIT WITH REDUCED NUMBER OF SEMICONDUCTOR ELEMENTS AND MULTIPLE OUTPUT PORTS

(71) Applicant: Korea Aerospace Research Institute, Daejeon (KR)

(72) Inventors: Jeong Eon Park, Daejeon (KR); Jung Kyu Han, Seoul (KR)

(73) Assignee: Korea Aerospace Research Institute, Daejeon (KR)

( * ) Notice: Subject to any disclaimer, the term of this patent is extended or adjusted under 35 U.S.C. 154(b) by 288 days.

(21) Appl. No.: 17/870,360

(22) Filed: Jul. 21, 2022

(65) Prior Publication Data
US 2023/0098360 A1 Mar. 30, 2023

(30) Foreign Application Priority Data

Sep. 28, 2021 (KR) .......................... 10-2021-0127787

(51) Int. Cl.
*H02M 3/335* (2006.01)
*H02M 1/00* (2006.01)
*H02M 3/158* (2006.01)

(52) U.S. Cl.
CPC ..... *H02M 1/0095* (2021.05); *H02M 3/33561* (2013.01); *H02M 3/33569* (2013.01); *H02M 3/158* (2013.01)

(58) Field of Classification Search
CPC .............................................. H02M 3/33561
See application file for complete search history.

(56) References Cited

U.S. PATENT DOCUMENTS 7,026,767 B2   4/2006   Yang
2020/0398686 A1  12/2020  Tang et al.

FOREIGN PATENT DOCUMENTS

CN    107846147    3/2018
JP      6066671    1/2017
KR    101083538    11/2011

OTHER PUBLICATIONS

Dong et al., "A Family of Integrated Dual-Output DC-DC converters: Synthesis Methodology and Performance Analysis", 2016 IEEE 8th International Power Electronics and Motion Control Conference, May 22, 2016, pp. 342-347.
Olive Ray et al., "A Multi-Port Converter Topology with Simultaneous Isolated and Non-Isolated Outputs", IECON 2013, Nov. 10, 2013, pp. 7118-7123.

(Continued)

*Primary Examiner* — Peter M Novak
(74) *Attorney, Agent, or Firm* — Boyle Fredrickson, S.C.

(57) ABSTRACT

Disclosed are a high-efficiency integrated power circuit with a reduced number of semiconductor elements and a control method thereof. A high-efficiency integrated power circuit of an integrated converter includes an input port, which is a first port, to which power for driving the integrated converter is input, a non-isolated port, which is a second port, for outputting, to outside the high-efficiency integrated power circuit, an allowable amount of power generated when power input through the input port passes through an inductor, and an isolated port, which is a third port, for conducing remaining power excepting power output through the non-isolated port and for maintaining the conducted remaining power inside the high-efficiency integrated power circuit.

11 Claims, 18 Drawing Sheets

(56) References Cited

OTHER PUBLICATIONS

Mukhtar Nurhakimah et al., "An Isolated Bidirectional Forward Converter with Integrated Output Inductor-Transformer Structure", 2018 IEE 4th Southern Power Electronics Conference, Dec. 10, 2018, pp. 1-7.

Wang J B: "Design a parallel buck derived converter system using the primary current droop sharing control", The Institution of Engineering and Technology, Journal,, vol. 4, No. 5, May 6, 2011 (May 6, 2011), pp. 491-502, XP006038384, ISSN: 1755-4543, DOI: 10.1049/IET-PEL:20100042.

Specification
- Input voltage range: 300~400V
- Switch frequency: 100kHz
- Output voltage: 28V / 150V
- Output power: 200W / 200W Design parameters

| Items | Conv. converters (Buck + TSF) | Prop. converters |
|---|---|---|
| Switches | IPZ60R017C7 × 3<br>(600V/69A/17mΩ) | IPZ60R017C7 × 2<br>(600V/69A/17mΩ) |
| Clamping diodes | SCS106AG × 2<br>(600V/1.5V/28pF) | |
| Transformer | PQ3230<br>(1.5mH, $N_p : N_s = 5 : 1$) | |
| Rectifier diodes | VSS8D3M12 × 2<br>(120V/0.61$V_F$/310pF)<br>SCS106AG × 1<br>(600V/1.5V/28pF) | VSS8D3M12 × 2<br>(120V/0.61$V_F$/310pF) |
| Inductors | CH166160 × 2 | |
| Capacitors | Samyoung SHL 1 mF × 4 | |

FIG.7A

HIGH-EFFICIENCY INTEGRATED POWER CIRCUIT WITH REDUCED NUMBER OF SEMICONDUCTOR ELEMENTS AND MULTIPLE OUTPUT PORTS

CROSS-REFERENCE TO RELATED APPLICATION(S)

This application claims the priority benefit of Korean Patent Application No. 10-2021-0127787 filed on Sep. 28, 2021, in the Korean Intellectual Property Office, the disclosure of which is incorporated herein by reference for all purposes.

These results were supported by Regional Innovation Strategy (RIS) through the National Research Foundation of Korea (NRF) funded by the Ministry of Education (MOE) (2021RIS-004).

BACKGROUND

1. Field

One or more example embodiments relate to a high-efficiency integrated power circuit with a reduced number of semiconductor elements and a control method thereof, and more particularly, a three-port direct current (DC)-DC converter circuit and a switching control method thereof.

2. Description of Related Art

As to a high bus voltage level of a typical satellite, a bus voltage level increases when power increases. A satellite bus voltage, which was maintained at a level of 50-100 volts (V), has currently increased to a level of 200-400 V as the number of satellites including units, such as an electric propulsion unit, a core nuclear fuel unit, and a high-power antenna, consume high power.

In addition, DC-DC converters in an isolated type or a non-isolated type are used in various units for various purposes. For example, a non-isolated DC-DC converter may be used to connect power lines inside an electric propulsion unit to each other, and an isolated DC-DC converter may be used to connect power lines outside the electric propulsion unit to each other or to other types of power lines.

A DC-DC converter to be provided for a satellite has many design limits, compared to a DC-DC converter for terrestrial uses. A high bus voltage power system of a satellite needs a heritage topology having a non-leg structure, and especially, an isolated converter topology of which a switch has high power-conversion efficiency and low voltage stress.

A typical DC-DC converter that has three ports has two output ports both non-isolated or both isolated, or doesn't have a bridge structure. Therefore, switch voltage stress is high due to hard switching and phase shift control is needed for an isolated output, which are unsuitable for a satellite converter.

Accordingly, for a satellite system of a high bus voltage level, a new DC-DC converter topology having a non-leg structure having both non-isolated and isolated output ports and of which a switch has low voltage stress and relatively high power-conversion efficiency needed to be developed.

SUMMARY

An aspect of the present disclosure provides a three-port direct current (DC)-DC converter circuit having one input port and a plurality of output ports that are non-isolated or isolated and a switching control method thereof.

Another aspect of the present disclosure also provides a converter having a non-leg structured heritage topology to have a switch with low voltage stress and high power-conversion efficiency.

According to an aspect, there is provided a high-efficiency integrated power circuit of an integrated converter with a reduced number of semiconductor elements, the high-efficiency integrated power circuit including: an input port, which is a first port, to which power for driving the integrated converter is input; a non-isolated port, which is a second port, for outputting, to outside the high-efficiency integrated power circuit, an allowable amount of power that is generated when power input through the input port passes through an inductor; and an isolated port, which is a third port, for conducting remaining power excluding power output by the non-isolated port and for maintaining the conducted remaining power inside the high-efficiency integrated power circuit.

According to another aspect, there is provided a control method of a high-efficiency integrated power circuit of an integrated converter with a reduced number of semiconductor elements, in which the high-efficiency integrated power circuit includes an input port, which is a first port, to which power for driving the integrated converter is input; a non-isolated port, which is a second port, for outputting, to outside the high-efficiency integrated power circuit, an allowable amount of power that is generated when power input through the input port passes through an inductor; an isolated port, which is a third port, for conducting remaining power excluding power output by the non-isolated port and for maintaining the conducted remaining power inside the high-efficiency integrated power circuit; and a plurality of switches for controlling a mode of the integrated converter, and in which the control method includes, according to a determined mode, by controlling the plurality of switches to be on or off, operating the integrated converter as a buck converter or a two-switch-forward (TSF) converter.

According to another aspect of the present disclosure, there is provided a three-port DC-DC converter circuit having one input port and a plurality of non-isolated and isolated output ports, for a high bus voltage level of a satellite system.

Another aspect of the present disclosure also provides a converter having a non-leg structured heritage topology that has a switch with low voltage stress and high power-conversion efficiency.

An integrated converter having a high-efficiency integrated power circuit with a reduced number of semiconductor elements may be applicable to an electric vehicle or an electric/electronic unit for a drone and/or an urban air mobility (UAM) in addition to an electric/electronic unit for a satellite.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIGS. 7A and 7B are graphs each illustrating a loss analysis and a simulation condition to validate a high-efficiency integrated power circuit according to example embodiments;

DETAILED DESCRIPTION

Figure 1:
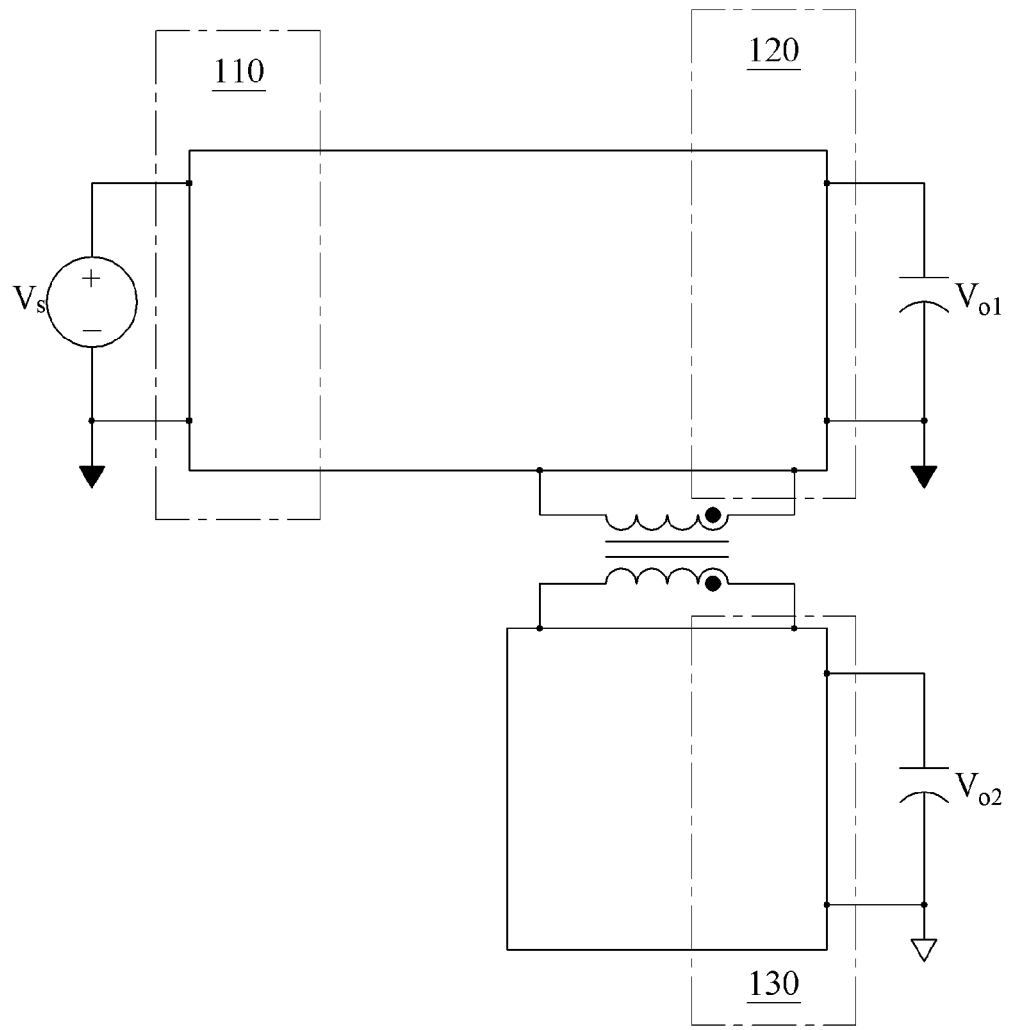
FIG. 1 is a circuit diagram illustrating a high-efficiency integrated power circuit according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

The present disclosure may be used to manufacture a three-port direct current (DC)-DC converter circuit having both non-isolated and isolated output ports to have a non-leg heritage topology structure such that a high bus voltage level is provided for a satellite system and a switch has low voltage stress and high power-conversion efficiency.

The present disclosure may provide a high-efficiency integrated power circuit of an integrated converter that is operable as a buck converter or a two-switch-forward (TSF) converter according to a predetermined mode through switching control of a circuit mode by a plurality of switches and by adding an inductor to a typical converter circuit and may provide a switching control method thereof.

FIG. 1 is a circuit diagram illustrating a high-efficiency integrated power circuit according to an example embodiment.

Referring to FIG. 1, a high-efficiency integrated power circuit 100 of an integrated converter may include an input port 110, a non-isolated port 120, and an isolated port 130.

The input port 110 may be a first port of the high-efficiency integrated power circuit 100 to which power for driving the integrated converter is input.

The non-isolated port 120 and the isolated port 130 may be a plurality of output ports (which respectively are a second port and a third port) of the high-efficiency integrated power circuit 100 for outputting power, which is generated when power input through the input port 110 passes through each different inductor, to outside the high-efficiency integrated power circuit 100.

For example, the non-isolated port 120 may be the second port of the high-efficiency integrated power circuit 100 for outputting, to outside the high-efficiency integrated power circuit 100, an allowable amount of power that is generated when power input through the input port 110 passes through an inductor.

The isolated port 130 may be the third port of the high-efficiency integrated power circuit 100 for conducting remaining power excluding power output by the non-isolated port 120 and for maintaining the conducted remaining power inside the high-efficiency integrated power circuit 100.

That is, the high-efficiency integrated power circuit 100 may refer to a circuit of a three-port integrated converter having the input port 110 as one input port and both the non-isolated port 120 and the isolated port 130 as a plurality of output ports.

The integrated converter may be a DC-DC converter that is applied to an electric propulsion unit provided for at least one of a satellite, a drone, and an electric vehicle.

As such, an integrated configuration of one input port (e.g., the input port 110) and two output ports (e.g., the non-isolated port 120 and the isolated port 130) may decrease the unit costs and weight of components.

Figure 2:
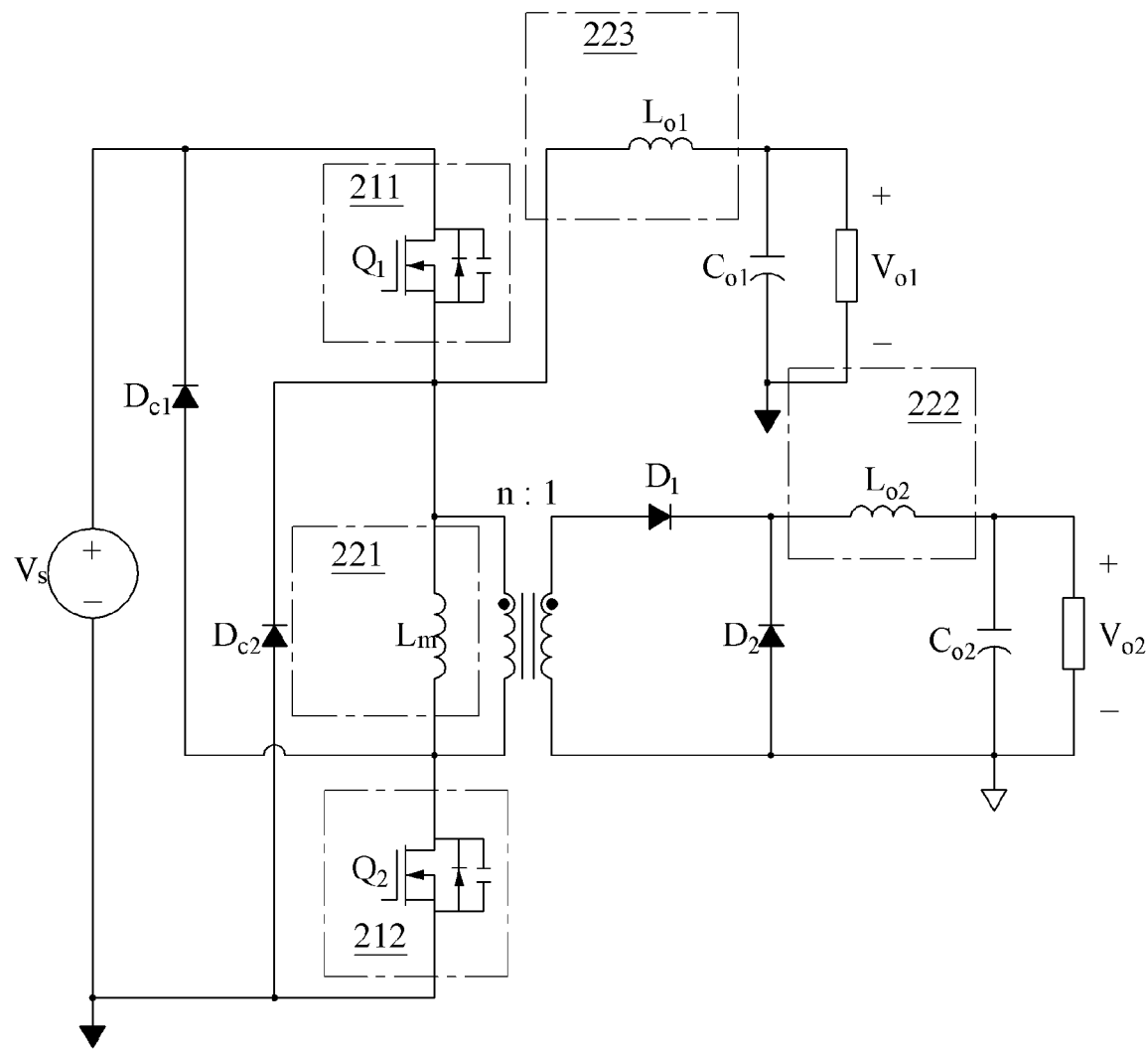
FIG. 2 is a circuit diagram illustrating a high-efficiency integrated power circuit according to another example embodiment.

FIG. 2 is a circuit diagram illustrating a high-efficiency integrated power circuit according to another example embodiment.

Referring to FIG. 2, a high-efficiency integrated power circuit 200 may further include a plurality of switches (switches 211 and 212) in addition to the components of the high-efficiency integrated power circuit 100 of FIG. 1.

In this case, an integrated converter may further include a third inductor 223, which is a passive element, in addition to first and second inductors 221 and 222 already included.

In other words, the integrated converter may further include the third inductor 223 connected to the non-isolated port 120, which is the second port, in addition to a converter, for example, a typical TSF converter, having the first inductor 221 connected between the plurality of switches (e.g., the switches 211 and 212) included in the high-efficiency integrated power circuit 200 and having the second inductor 222 connected to the isolated port 130, which is the third port.

As such, the integrated converter may further include a plurality of inductors (passive elements) (e.g., the first, second, and third inductors 211, 222, and 223), and the high-efficiency integrated power circuit 200 may independently control each of power outputs through the non-isolated and isolated ports 120 and 130 by controlling the plurality of switches to be on or off (e.g., the switches 211 and 212).

In addition, the high-efficiency integrated power circuit 200, according to a determined mode, by controlling the plurality of switches (e.g., the switches 211 and 212) to be on or off, may operate the integrated converter as a buck converter or a TSF converter. A cell 310 of the high-efficiency integrated power circuit 200 operating the integrated converter as a as a buck converter is illustrated in FIG. 3.

Figure 3:
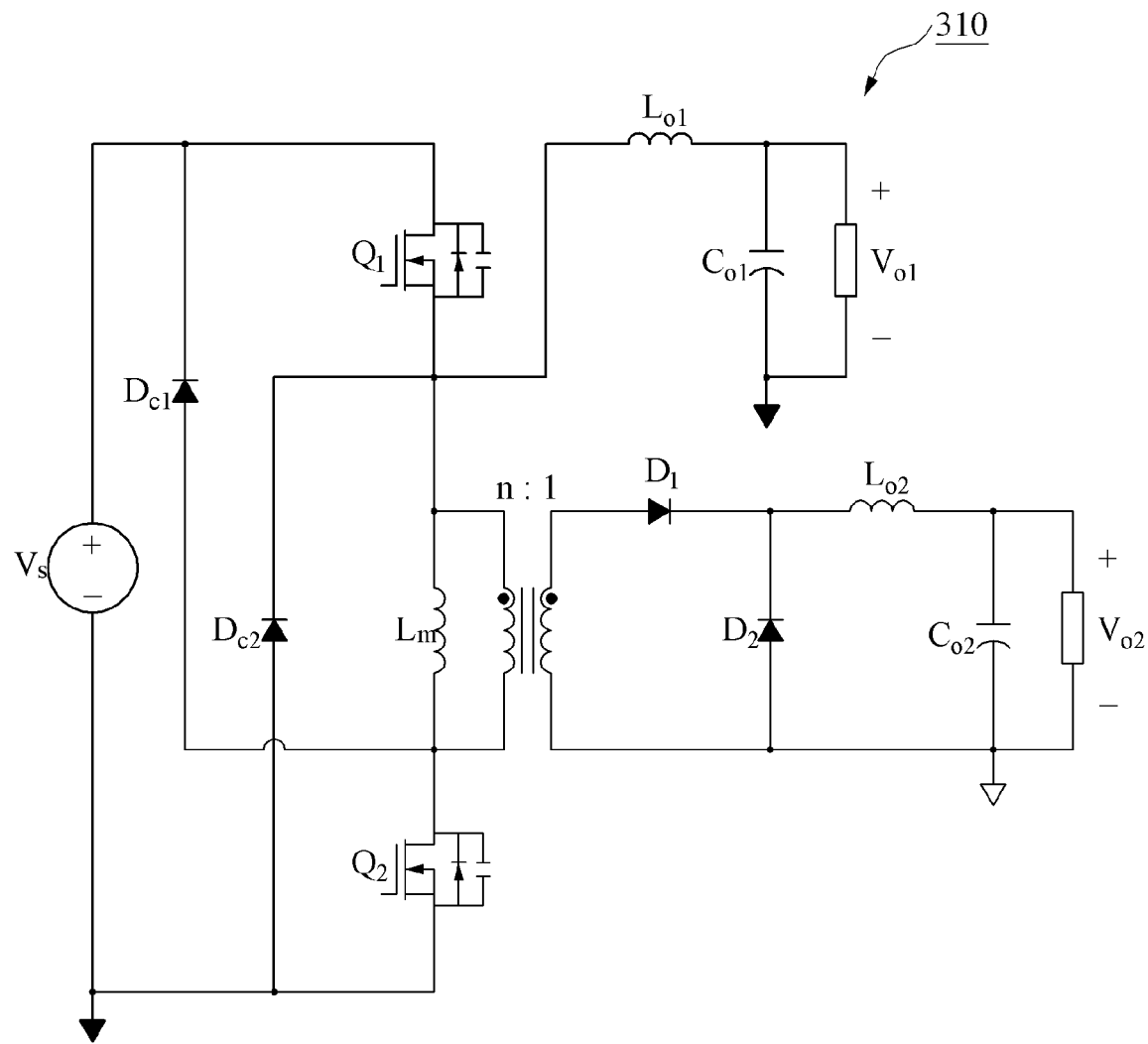
FIG. 3 is a circuit diagram illustrating a cell that is operating as a buck converter in a high-efficiency integrated power circuit according to another example embodiment.

FIG. 3 is a circuit diagram illustrating a cell that is operating as a buck converter in a high-efficiency integrated power circuit according to another example embodiment.

Referring to FIG. 3, according to a circuit mode by controlling a plurality of switches (e.g., the switches 211 and 212 of FIG. 2) to be on or off, when an integrated converter operates as a buck converter, a cell 310 may operate in a high-efficiency integrated power circuit 200.

Hereinafter, descriptions on a circuit mode by controlling the plurality of switches (e.g., the switches 211 and 212 of FIG. 2) to be on or off in an integrated converter that is operable as two converters (e.g., a buck or TSF converter) by adding one inductor to a TSF conductor will be provided with reference to FIGS. 4A through 4E.

FIGS. 4A through 4E are diagrams each illustrating a key waveform and an operating process according to each circuit mode in a high-efficiency integrated power circuit according to example embodiments.

FIGS. 4A through 4E respectively illustrates five circuit modes and their respective key waveforms therein in a structure sharing a buck converter by adding one inductor (a passive inductor).

Figure 4A:
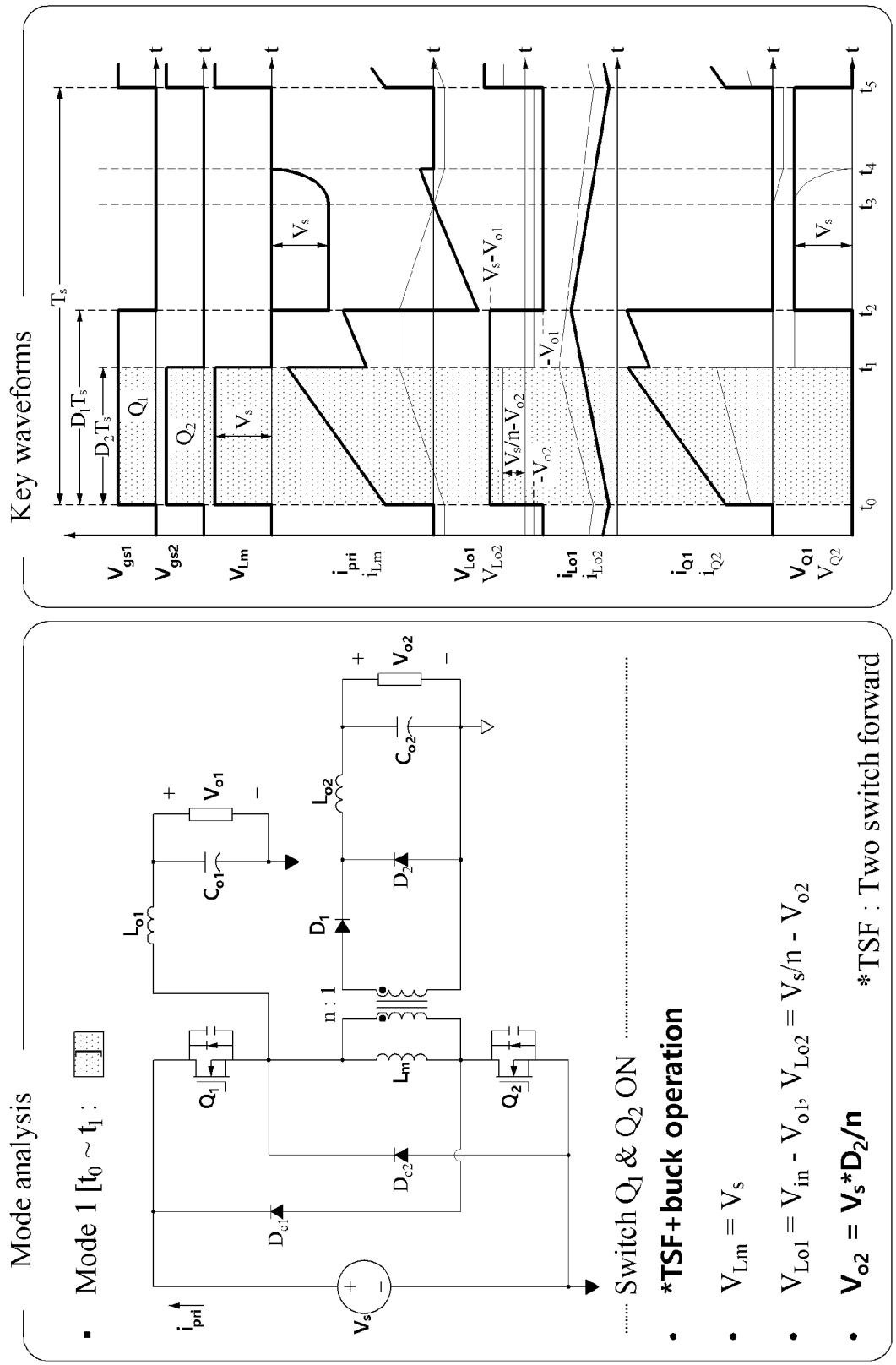
FIGS. 4A through 4E are diagrams each illustrating a key waveform and an operating process according to each circuit mode in a high-efficiency integrated power circuit according to example embodiments.

First, a description on a first mode is provided with reference to FIG. 4A. The high-efficiency integrated power circuit 200, for a certain period (from time $t_0$ to $t_1$) that is defined as the first mode, by turning on each of a plurality of switches (e.g., the switches 211 and 212 of FIG. 2) (Switches $Q_1$ and $Q_2$ ON), may operate an integrated converter both as a buck converter and a TSF converter (TSF+buck operation).

In this case, a voltage $V_{Lm}$ of an inductor Lm may be $V_{Lm}=V_s$, a voltage $V_{Lo1}$ of an inductor $L_{o1}$ may be $V_{Lo1}=$input voltage Vin-non-isolated output voltage $V_{o1}$, a voltage $V_{Lo2}$ of an inductor $L_{o2}$ may be $V_{Lo2}=(V_s/n)-$isolated output voltage $V_{o2}$, and thus, the isolated output voltage $V_{o2}$ may be $V_{o2}=V_s*D_2/n$. In this case, $D_2$ denotes a duty of the switch $Q_2$, and n denotes a turn ratio of n:1 and may be determined to be, for example, less than or equal to 5, based on an output voltage and a duty range less than or equal to 0.5 and $D_1$.

Figure 4B:
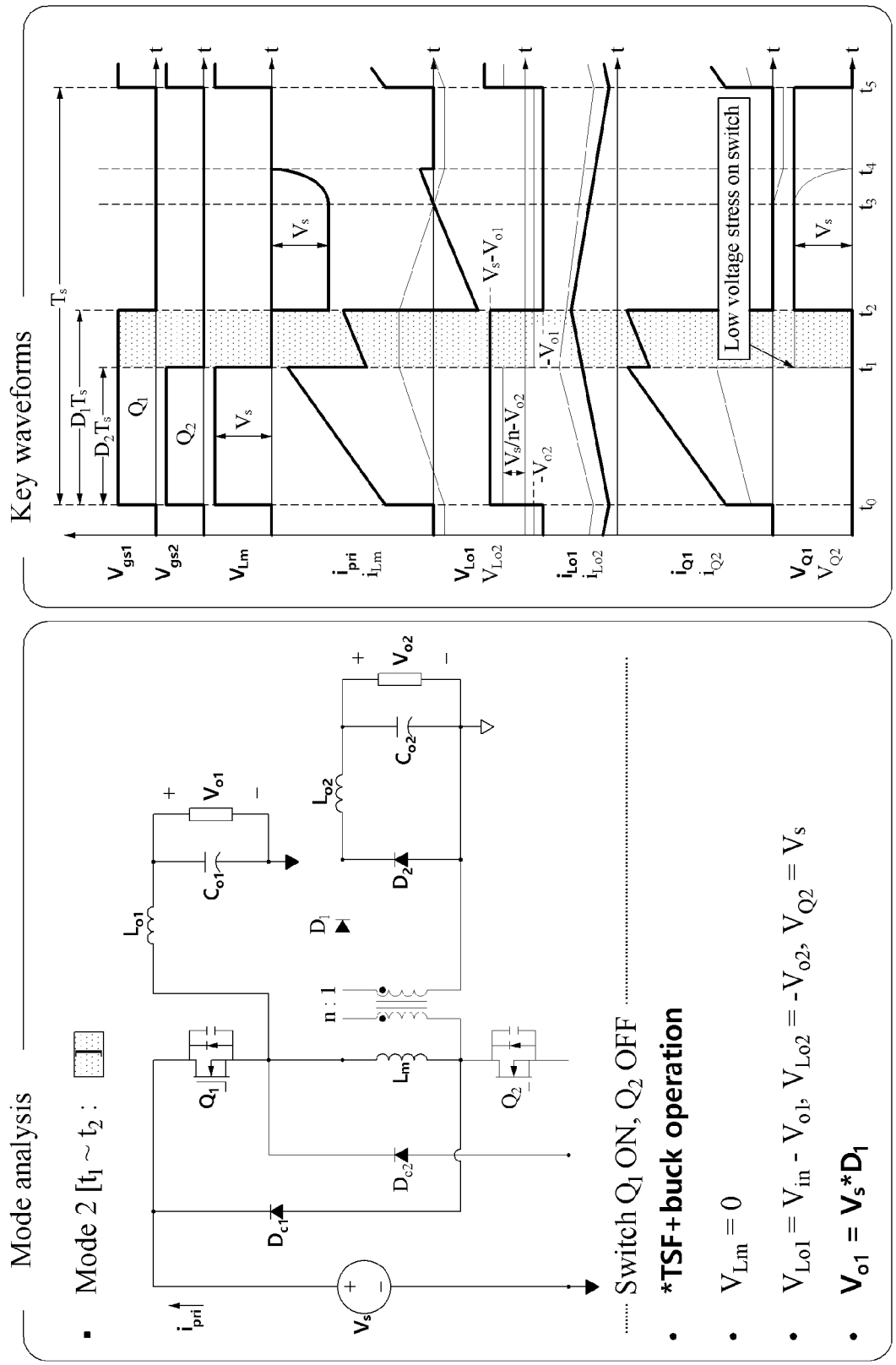

In addition, a description on a second mode is provided with reference to FIG. 4B. The high-efficiency integrated power circuit 200, for a next period (from time $t_1$ to $t_2$) defined as the second mode after the first mode, by turning on the first switch $Q_1$ and turning off the second switch $Q_2$ (Switch $Q_1$ ON & Switch $Q_2$ OFF) of the plurality of switches (e.g., the switches $Q_1$ and $Q_2$), may operate the integrated converter as a buck converter (buck operation).

In this case, the voltage $V_{Lm}$ of the inductor Lm may be $V_{Lm}=0$, the voltage $V_{Lo1}$ of the inductor $L_{o1}$ may be $V_{Lo1}=$input voltage Vin-non-isolated output voltage $V_{o1}$, and the voltage $V_{Lo2}$ of the inductor $L_{o2}$ may be $V_{Lo2}=-$isolated output voltage $V_{o2}$, and thus, a voltage $V_{Q2}$ of the switch $Q_2$ may be $V_{Q2}=V_s$, and the non-isolated output voltage $V_{o1}$ may be $V_{o1}=V_s*D_1$. Here, $D_1$ denotes a duty of the switch $Q_1$.

Figure 4C:
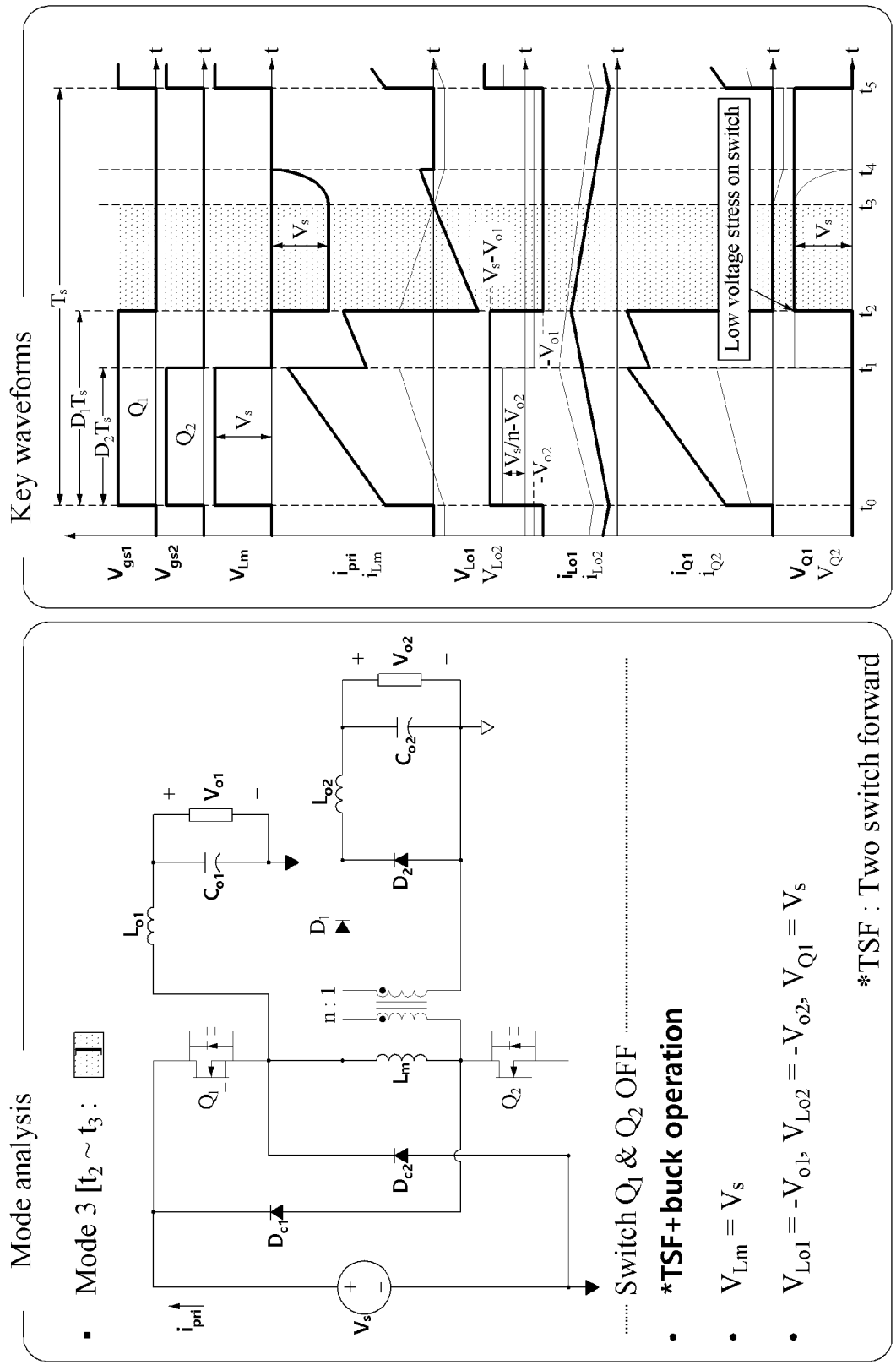

In addition, a description on a third mode is provided with reference to FIG. 4C. The high-efficiency integrated power circuit 200, for a next certain period (from time $t_2$ to $t_3$) defined as the third mode after the second mode, by turning off each of the switches $Q_1$ and $Q_2$ (Switches $Q_1$ and $Q_2$ OFF), may operate the integrated converter again both as a buck converter and a TSF converter (TSF+buck operation).

In this case, the voltage $V_{Lm}$ of the inductor Lm may be $V_{Lm}=-V_s$, the voltage $V_{Lo1}$ of the inductor $L_{o1}$ may be $V_{Lo1}=-$non-isolated output voltage $V_{o1}$, and the voltage $V_{Lo2}$ of the inductor $L_{o2}$ may be $V_{Lo2}=-$isolated output voltage $V_{o2}$, and thus, a voltage $V_{o1}$ of the switch $Q_1$ may be $V_{Q1}=V_s$.

Figure 4D:
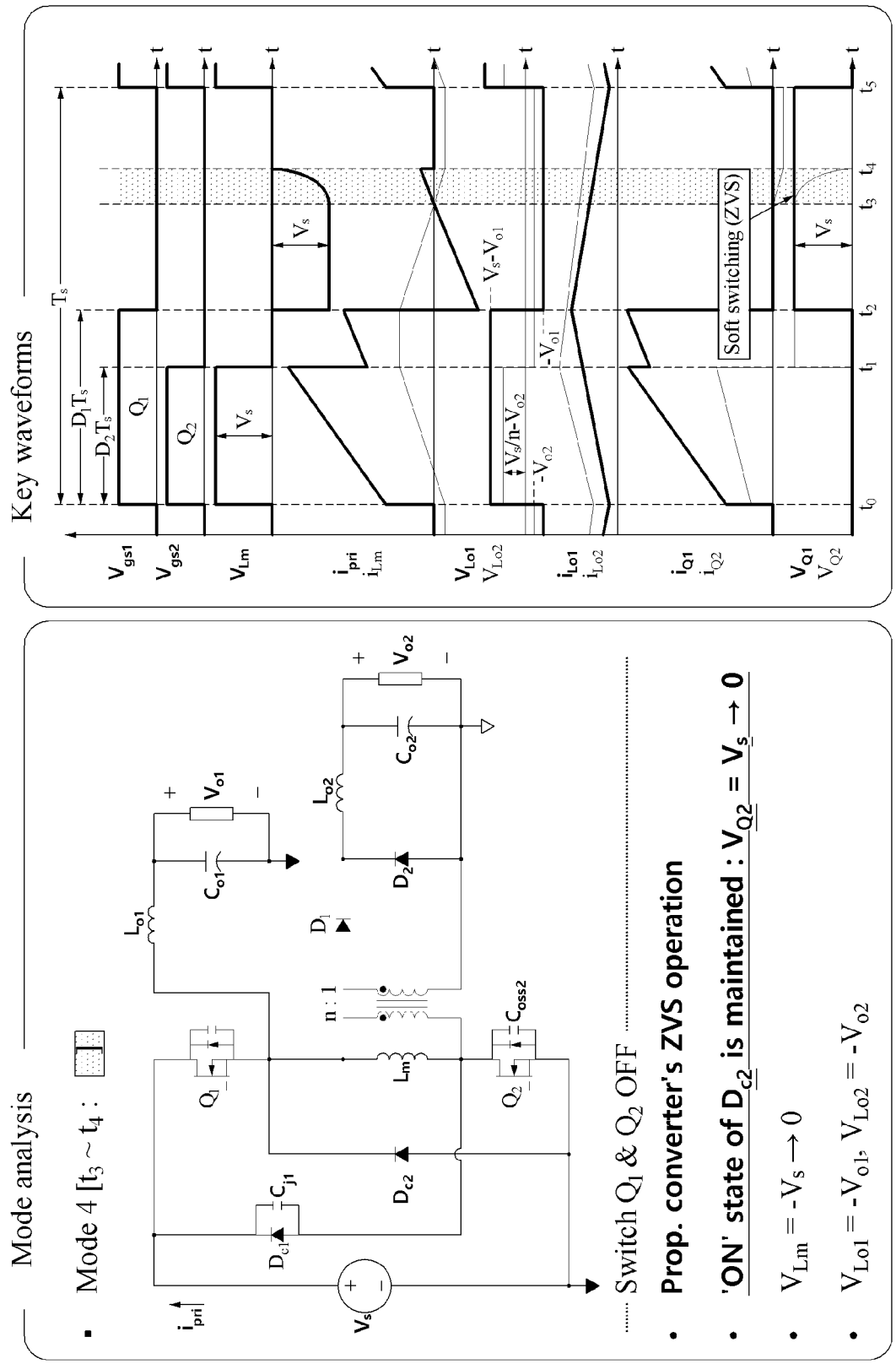

In addition, a description on a fourth mode is provided with reference to FIG. 4D. The high-efficiency integrated power circuit 200, for a next period (time $t_3$ to $t_4$) defined as the fourth mode after the third mode, by maintaining each of the switches $Q_1$ and $Q_2$ to be off (Switches $Q_1$ and $Q_2$ OFF), may operate the switch $Q_2$, which is a second switch, in zero-voltage switching (ZVS).

In this case, a state of $D_{c2}$ may be maintained to be 'on', the voltage $V_{Q2}$ of the switch $Q_2$ may be from $V_s$ to 0 ($V_{Q2}=V_s \rightarrow 0$), and thus, the voltage $V_{Lm}$ of the inductor Lm may be from $-V_s$ to 0 ($V_{Lm}=-V_s \rightarrow 0$).

Figure 4E:
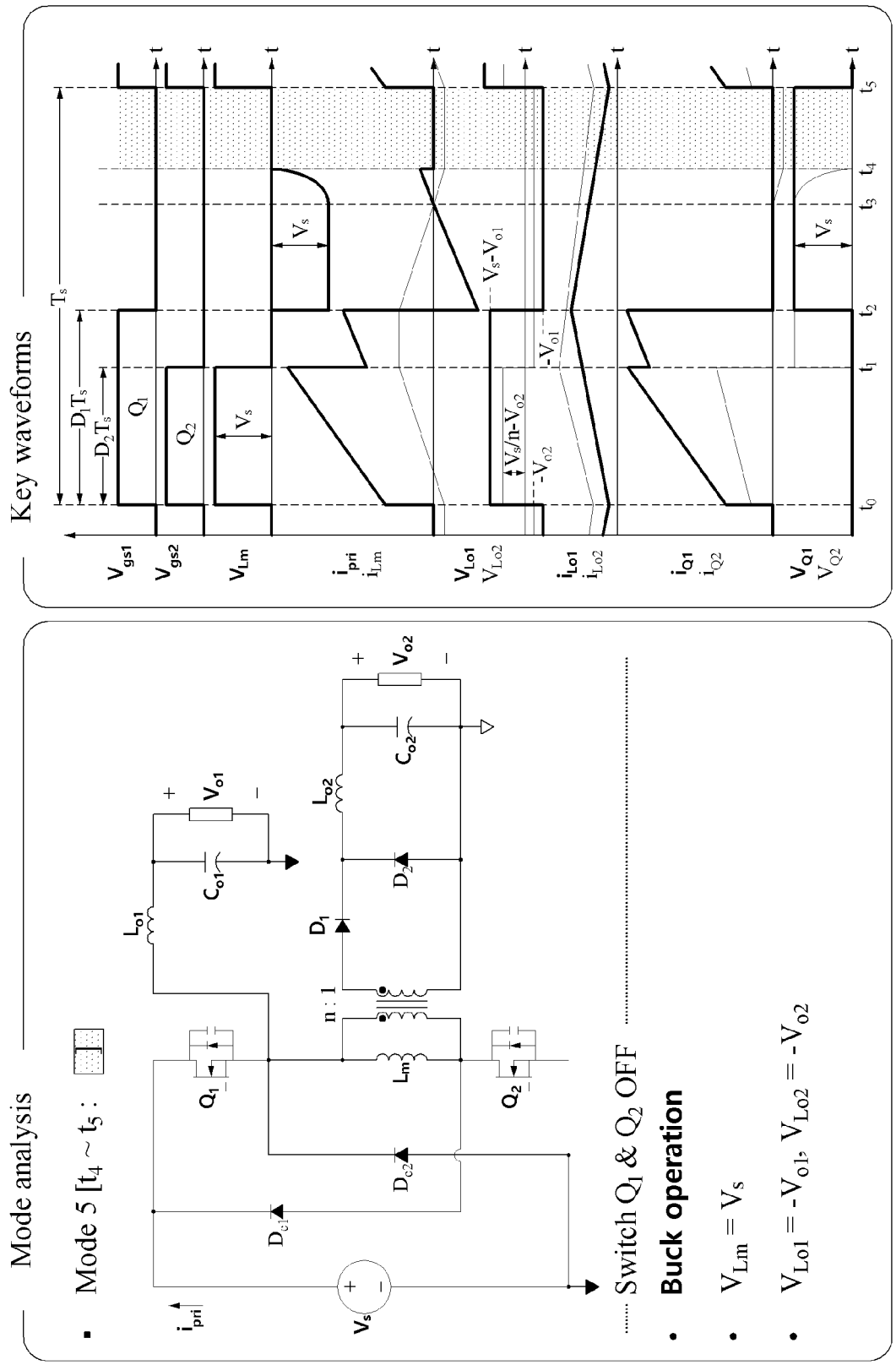

In addition, a description on a fifth mode is provided with reference to FIG. 4E. The high-efficiency integrated power circuit 200, for a next certain period (from time $t_4$ to $t_5$) defined as the fifth mode after the fourth mode, by further maintaining each of the switches $Q_1$ and $Q_2$ to be off (Switches $Q_1$ and $Q_2$ OFF), may operate the integrated converter as a buck converter (buck operation).

In this case, the voltage $V_{Lm}$ of the inductor Lm may be $V_{Lm}=0$, the voltage $V_{Lo1}$ of the inductor $L_{o1}$ may be $V_{Lo1}=-$non-isolated output voltage $V_{o1}$, and the voltage $V_{Lo2}$ of the inductor $L_{o2}$ may be $V_{Lo2}=-$isolated output voltage $V_{o2}$.

Through the above-described process, the non-isolated output voltage $V_{o1}$ and the isolated output voltage $V_{o2}$ may each be independently controlled by the non-isolated port 120 connected to the inductor $L_{o1}$ (e.g., the third inductor 223 of FIG. 2) and the isolated port 130 connected to the inductor $L_{o2}$ (e.g., the second inductor 222 of FIG. 2).

The high-efficiency integrated power circuit 200 may readily control an integrated converter that may operate as a DC-DC converter having both isolated and non-isolated output ports by adding one inductor (the inductor $L_{o1}$ or the third inductor 223 of FIG. 2) to a typical TSF converter.

That is, the high-efficiency integrated power circuit 200, according to a circuit mode determined by controlling switching of a plurality of switches (e.g., the switches $Q_1$ and $Q_2$ or the switches 211 and 212 of FIG. 2), may operate an integrated converter as a buck converter or a TSF converter.

The integrated converter may decrease unit costs and weight through a reduced number of devices, and additionally, may increase power conversion efficiency by enabling ZVS of the switch $Q_2$.

Figure 5:
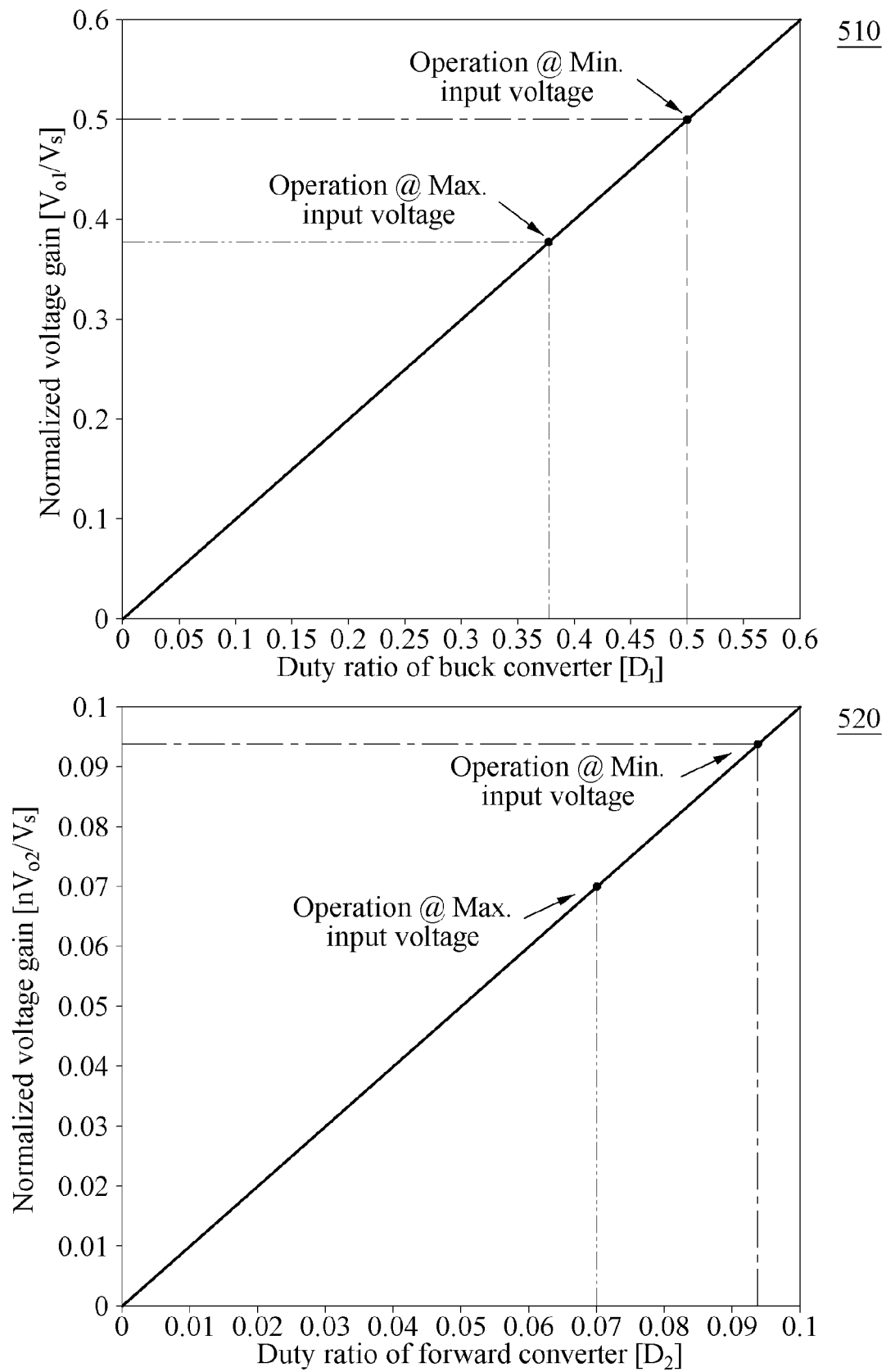
FIG. 5 is a graph illustrating a voltage gain in an integrated converter that is operated by a high-efficiency integrated power circuit according to example embodiments.

FIG. 5 is a graph illustrating a voltage gain in an integrated converter that is operated by a high-efficiency integrated power circuit according to example embodiments.

FIG. 5 illustrates a graph 510 representing a buck converter voltage gain in the integrated converter and a graph 520 representing a TSF converter voltage gain in the integrated converter.

According to the graph 510, a duty of a switch $Q_1$ is normalized through one output of a buck converter, and similarly, according to the graph 520, a duty of a switch $Q_2$ is regularized through one output of a TSF converter. In this case, to reset an inductor Lm, the duties of the switches $Q_1$ and $Q_2$ may be less than or equal to 0.5 ($D_2<D_1<0.5$).

In summary, according to the graphs 510 and 520 illustrated in FIG. 5, outputs in both directions of the integrated converter may each be independently controlled by the switches $Q_1$ and $Q_2$, which may be represented by Equation $V_{o1}=D_1*Vin/V_{o2}=n*D_2*Vin$. In this case, Vin denotes an input voltage, $V_{o1}$ denotes a non-isolated output voltage, $V_{o2}$ denotes an isolated output voltage, $D_1$ denotes the duty of the switch $Q_1$, $D_2$ denotes the duty of the switch $Q_2$, and n denotes a turn ratio.

Figure 6:
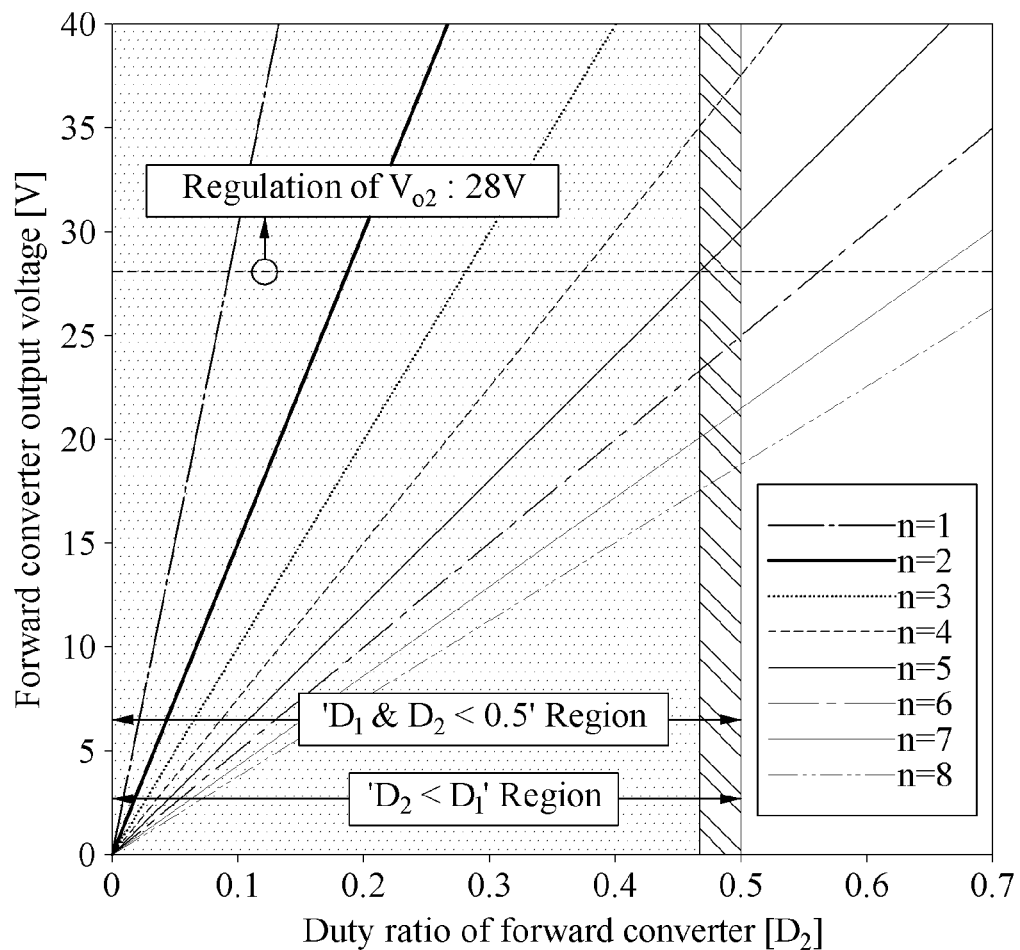
FIG. 6 is a graph illustrating a turn ratio in an integrated converter that is operated by a high-efficiency integrated power circuit according to example embodiments.

FIG. 6 is a graph illustrating a turn ratio in an integrated converter that is operated by a high-efficiency integrated power circuit according to example embodiments.

Referring to a graph 600 illustrated in FIG. 6, a turn ratio may be determined based on an output voltage and a duty range less than or equal to 0.5 and $D_1$ and may be, for example, less than or equal to 5.

Figure 7B:
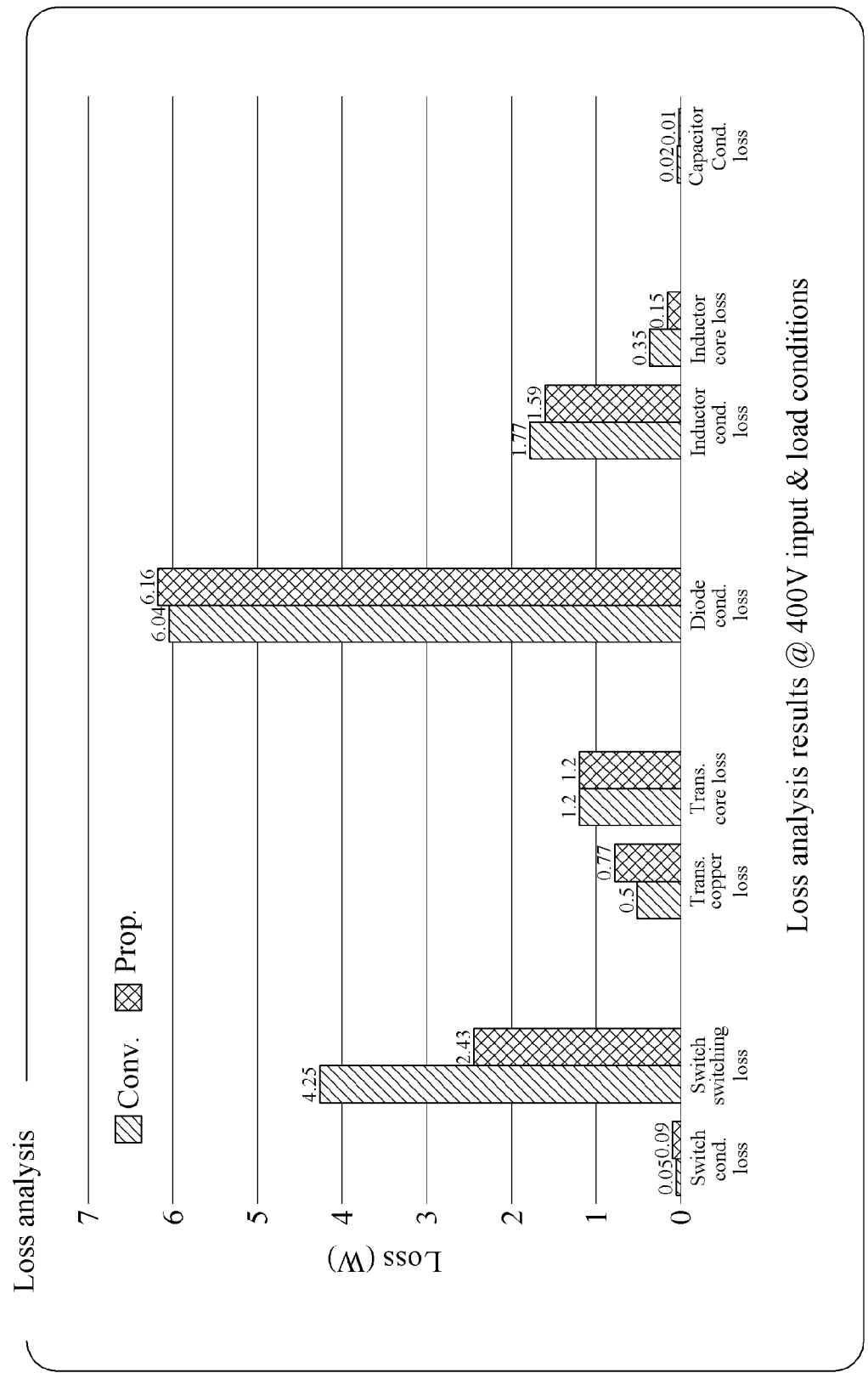

FIGS. 7A and 7B are graphs each illustrating a loss analysis and a simulation condition to validate a high-efficiency integrated power circuit according to example embodiments.

FIG. 7A illustrates a comparison between a simulation condition when operating each of a buck converter and a TSF converter separately according to a typical example embodiment and a simulation condition when operating an integrated converter by a mode control of the high-efficiency integrated power circuit herein.

According to FIG. 7A, Conv. converters may need three 'IPZ60R017C7' switches, while Prop. converters may need two switches, and the number of diodes needed by Prop. converters are one less than that of Conv. converters.

FIG. 7B illustrates a graph comparing a switching loss (left) in Conv. converters with a switching loss (right) in Prop. converters, and a switching loss significantly decreases in Prop. converters compared to Conv. converters by removing one switch and operating the switch $Q_2$ in ZVS in Prop. converters.

Figure 8A:
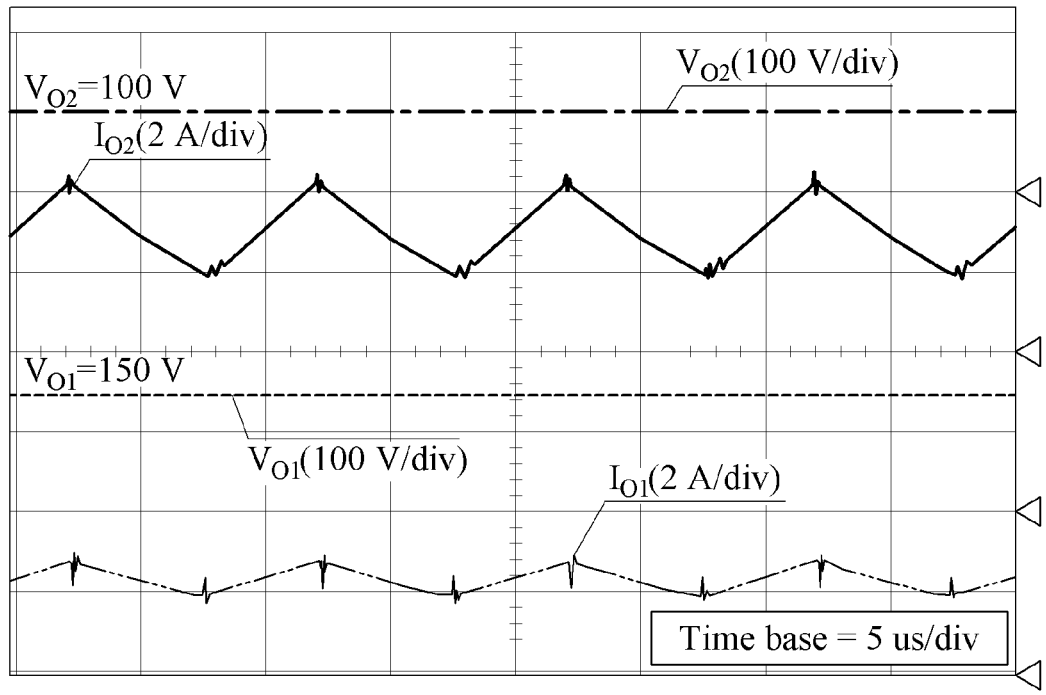
FIGS. 8A and 8B are graphs each illustrating an example of a waveform test result in a high-efficiency integrated power circuit according to example embodiments.
Figure 8B:
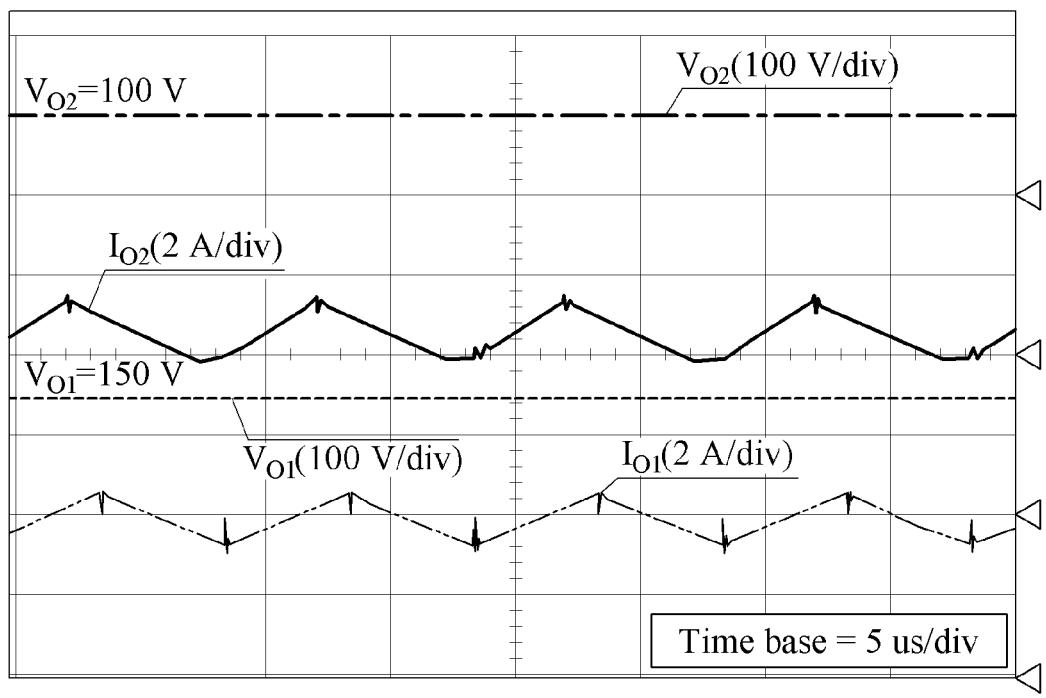
Figure 9A:
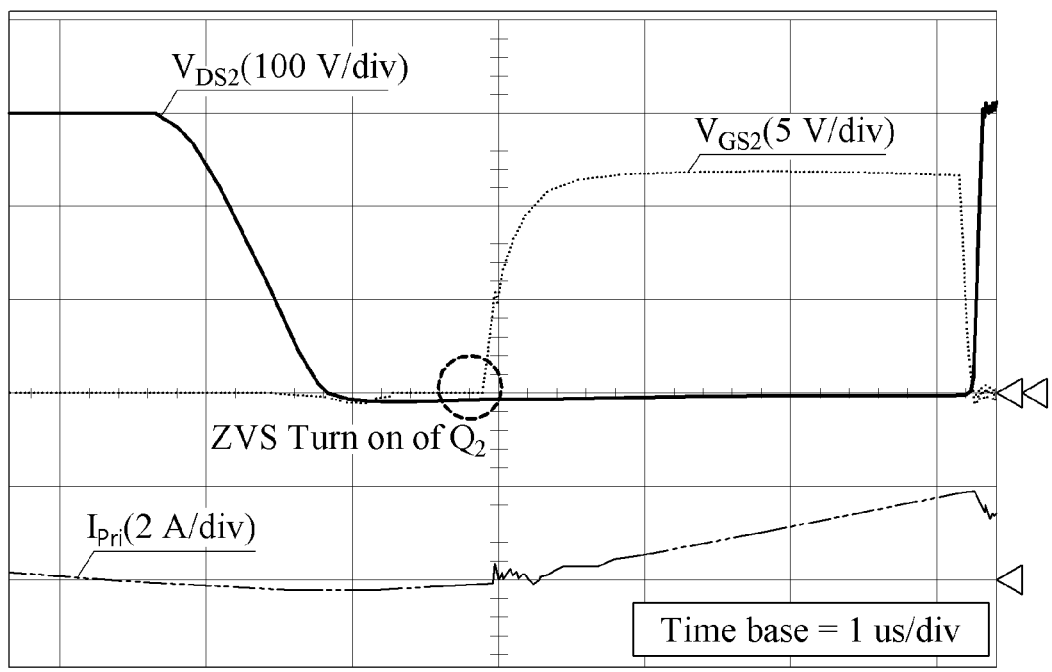
FIGS. 9A through 9D are graphs each illustrating another example of a waveform test result in a high-efficiency integrated power circuit according to example embodiments.
Figure 9B:
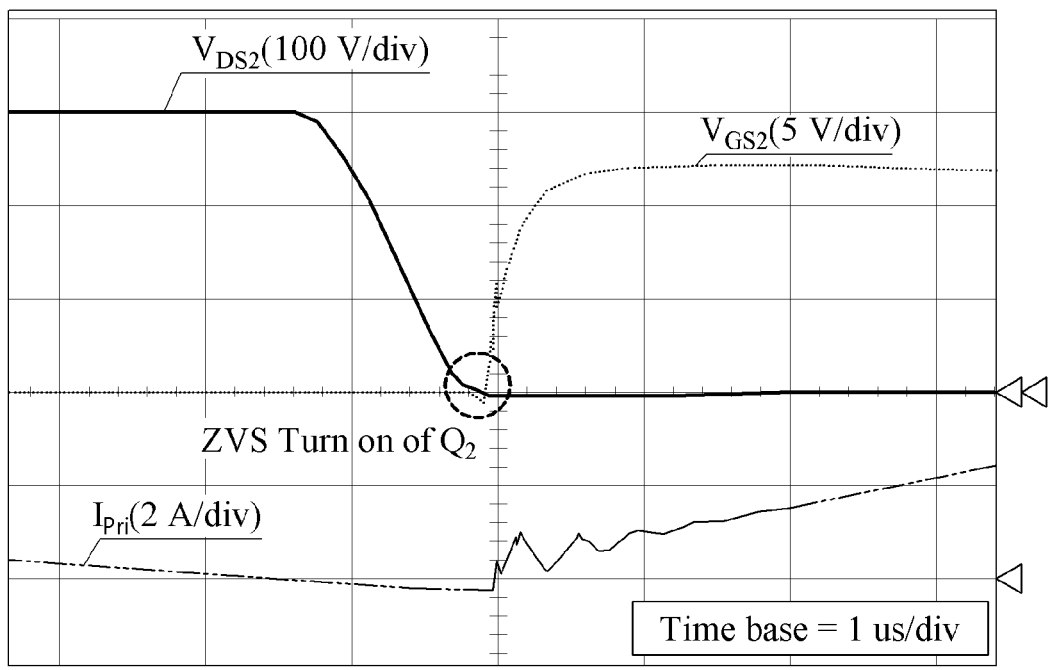
Figure 9C:
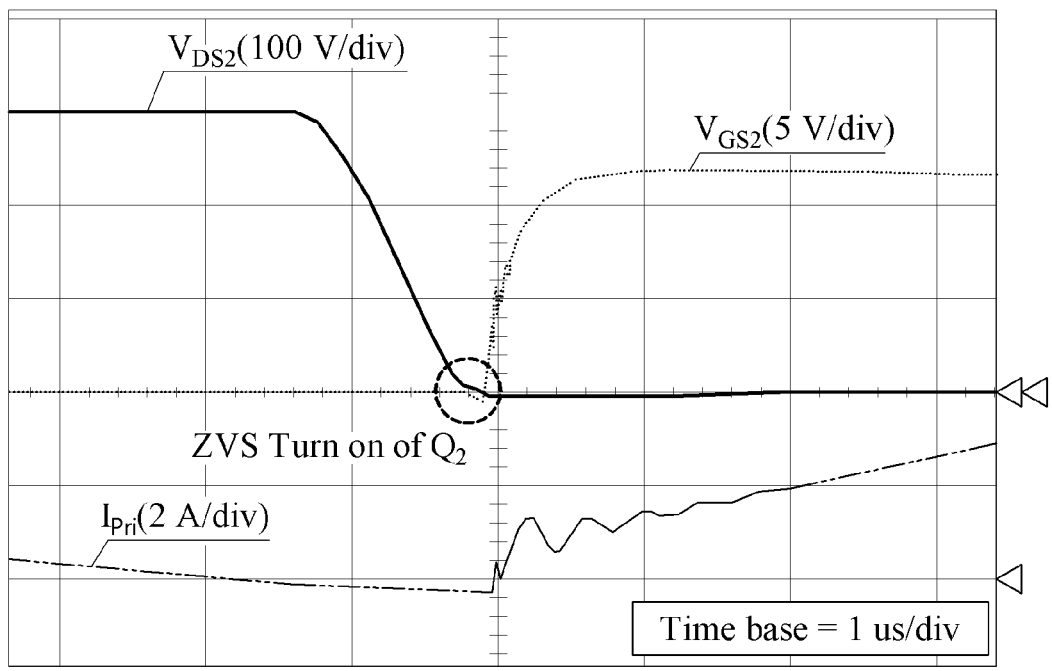
Figure 9D:
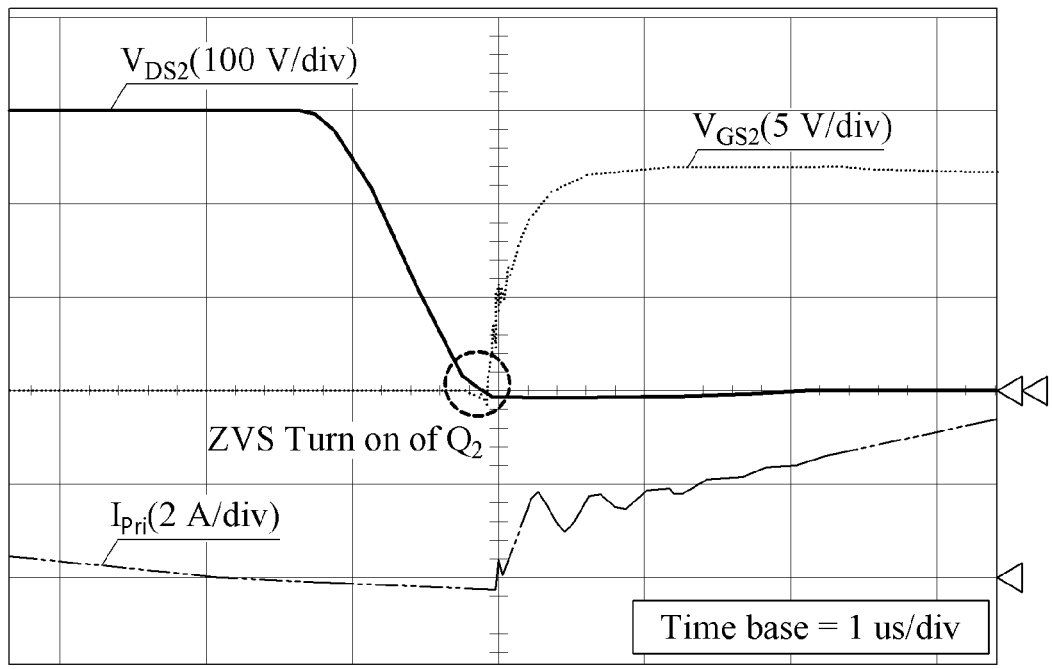

FIGS. 8A and 8B are graphs each illustrating an example of a waveform test result in a high-efficiency integrated power circuit according to example embodiments.

A waveform illustrated in FIG. 8A may represent, when a load of a buck converter output is 20% and a load of a TSF converter output is 100% (referred to as 'cross-regulation'), that the buck and TSF converter outputs both readily control typical output voltages of 100 V and 150 V.

As illustrated in FIG. 8A, the high-efficiency integrated power circuit, by assigning 100% of a load to the TSF converter, may distinctively increase the size of $I_{o2}$ on $V_{o2}$ 100 V. Conversely, the high-efficiency integrated power circuit may relatively decrease the size of $I_{o1}$ on $V_{o1}$ 150 V, compared to the size of $I_{o2}$, with respect to an output of the buck converter to which a 20% of a load is assigned.

A waveform illustrated in FIG. 8B may represent, when the load of the buck converter output is 100% and the load of the TSF converter output is 20% (referred to as 'cross-regulation'), that the buck and TSF converter outputs both readily control the typical output voltages of 100 V and 150 V.

Waveforms illustrated in FIGS. 8A and 8B are waveforms directly verified through a test that a converter is regulated while readily controlling each of output voltages in a cross-regulation situation.

In contrast to FIG. 8A, in FIG. 8B, the high-efficiency integrated power circuit, by assigning 100% of the load to the buck converter, may distinctively increase the size of $V_{o1}$ on $V_{o1}$ 150 V. Conversely, the high-efficiency integrated power circuit may relatively decrease the size of $V_{o2}$ on $V_{o2}$ 100 V, compared to the size of $I_{o1}$, with respect to an output of the TSF converter to which 20% of the load is assigned.

That is, the high-efficiency power circuit may readily control different types of output voltages by appropriately cross-regulating a load assigned to a buck converter output and a load assigned to a TSF converter output.

FIGS. 9A through 9D are graphs each illustrating another example of a waveform test result in a high-efficiency integrated power circuit according to example embodiments.

Waveforms illustrated in FIGS. 9A through 9D may be test waveforms each representing ZVS achievements of the switch $Q_2$ when loads are 20%, 50%, 70%, and 100%, respectively, in sequential order.

The waveforms of FIGS. 9A through 9D are test waveforms for which voltage stress of the switch $Q_2$, a current of the switch $Q_2$, and a current waveform from a primary side is verified, through an actual test, to verify ZVS of the switch $Q_2$.

In FIGS. 9A through 9D, the high-efficiency integrated power circuit, as sequentially assigning 20%, 50%, 70%, and 100% of loads to converter outputs, may differentiate between a point where $V_{DS2}$ is grounded, a point where ZVS turns on, and a point where $V_{GS2}$ is reversed.

In addition, the high-efficiency integrated power circuit may sequentially increase the size of $I_{Pr1}$ on $V_{GS2}$ as sequentially assigning 20%, 50%, 70%, and 100% of loads.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A high-efficiency integrated power circuit of an integrated converter, the high-efficiency integrated power circuit comprising:
   an input port, which is a first port, to which power for driving the integrated converter is input, wherein the input port includes a first terminal and a second terminal;
   a first switch connected to the first terminal of the input port;
   a second switch connected to the second terminal of the input port;
   a first inductor connected in series between the first switch and the second switch;

a non-isolated port, connected between the first switch and the first inductor, wherein the non-isolated port is a second port, for outputting, to outside the high-efficiency integrated power circuit, a first portion of power that is generated when power input through the input port passes through an input inductor; and an isolated port, connected in parallel to the first inductor, wherein the isolated port is a third port, for conducting a second portion of power that is generated, excluding the first portion of power and for maintaining the conducted second portion of power inside the high-efficiency integrated power circuit.

2. The high-efficiency integrated power circuit of claim 1, further comprising:
a second inductor connected to the isolated port; and
a third inductor connected to the non-isolated port.

3. The high-efficiency integrated power circuit of claim 1, wherein
the integrated converter comprises:
a direct current (DC)-DC converter that is applied to an electric propulsion unit provided for at least one of a satellite, a drone, and an electric vehicle.

4. The high-efficiency integrated power circuit of claim 1, wherein:
the first switch and the second switch control a mode of the integrated converter,
the high-efficiency integrated power circuit is configured to,
according to a determined mode, by controlling the first switch and the second switch to be on or off,
operate the integrated converter as a buck converter or a two-switch-forward (TSF) converter.

5. The high-efficiency integrated power circuit of claim 4, wherein
the high-efficiency integrated power circuit is configured to,
by controlling the first switch and the second switch to be on or off, independently control a power output of the isolated port and a power output of the non-isolated port.

6. The high-efficiency integrated power circuit of claim 4, wherein
the high-efficiency integrated power circuit is configured to
operate in a first mode both as a buck converter and a TSF converter, and wherein during the first mode the first switch and the second switch are both in an ON state.

7. The high-efficiency integrated power circuit of claim 6, wherein
the high-efficiency integrated power circuit is configured to
operate in a second mode as a buck converter, and wherein during the second mode the first switch is in an OFF state and the second switch is in an ON state.

8. The high-efficiency integrated power circuit of claim 7, wherein
the high-efficiency integrated power circuit is configured to
operate in a third mode both as a buck converter and a TSF converter, and wherein during the third mode the first switch is an OFF state and the second switch is in an OFF state.

9. The high-efficiency integrated power circuit of claim 8, wherein:
the high-efficiency integrated power circuit is configured to
operate in a fourth mode with the first switch in an OFF state, the second switch in an OFF state, and an initial current present through the first inductor is greater than zero amps; and
with the first switch and the second switch in the OFF state decay the current through the first inductor to decay a voltage across the second switch to zero volts and
operate the integrated converter as a buck converter.

10. A control method of a high-efficiency integrated power circuit of an integrated converter, wherein
the high-efficiency integrated power circuit comprises:
an input port, which is a first port, to which power for driving the integrated converter is input, and wherein the input port includes a first terminal and a second terminal;
a first switch connected to the first terminal of the input port;
a second switch connected to the second terminal of the input port;
a first inductor connected in series between the first switch and the second switch;
a non-isolated port, connected between the first switch and the first inductor, wherein the non-isolated port is a second port, for outputting, to outside the high-efficiency integrated power circuit, a first portion of power that is generated when power input through the input port passes through an input inductor;
an isolated port, connected in parallel to the first inductor, wherein the isolated port is a third port, for conducting a second portion of power that is generated, excluding the first portion of power, and for maintaining the conducted second portion of power inside the high-efficiency integrated power circuit,
wherein
the control method comprises:
according to a determined mode, by controlling the first switch and the second switch to be on or off,
operating the integrated converter as a buck converter or a two-switch-forward (TSF) converter.

11. The control method of claim 10, wherein
the integrated converter is configured by
adding a second inductor to the isolated port, and
adding a third inductor connected to the non-isolated port.

* * * * *

UNITED STATES PATENT AND TRADEMARK OFFICE
CERTIFICATE OF CORRECTION

| | | |
|---|---|---|
| PATENT NO. | : 12,237,759 B2 | Page 1 of 1 |
| APPLICATION NO. | : 17/870360 | |
| DATED | : February 25, 2025 | |
| INVENTOR(S) | : Jeong Eon Park et al. | |

It is certified that error appears in the above-identified patent and that said Letters Patent is hereby corrected as shown below:

In the Specification

Column 1, Line 17, please add the following:
-- This work was supported by the National Research Foundation of Korea(NRF) grant funded by the Korea government(MSIT) (No.2018R1A6A1A03026005), and additionally support by the Ministry of Science and ICT (MSIT) and was conducted under the ICAN support project (IITP-2025-RS-2022-00156212) hosted by IITP. --

Signed and Sealed this
Tenth Day of June, 2025

Coke Morgan Stewart
*Acting Director of the United States Patent and Trademark Office*